United States Patent
Miyada

[11] 3,940,924
[45] Mar. 2, 1976

[54] ROTARY ENGINE
[76] Inventor: Thomas Sanfran Miyada, P.O. Box 430, Summit, N.J. 07901
[22] Filed: Oct. 2, 1974
[21] Appl. No.: 511,235

[52] U.S. Cl. ............ 60/39.08; 60/39.37; 60/39.45; 418/191; 418/227
[51] Int. Cl.[2] ...................... F02C 7/06; F02C 3/00
[58] Field of Search............ 60/39.08, 39.37, 39.45, 60/39.51, 39.38; 418/191, 192, 198, 227

[56] References Cited
UNITED STATES PATENTS

| | | | |
|---|---|---|---|
| 893,485 | 7/1908 | Grinrod | 418/191 |
| 3,072,316 | 1/1963 | Mossin | 418/191 |
| 3,525,214 | 8/1970 | Demo | 60/39.37 |

*Primary Examiner*—Carlton R. Croyle
*Assistant Examiner*—L. J. Casaregola

[57] ABSTRACT

This invention relates to a rotary engine that functions without internal gears, off-centered rotors, reciprocating pistons, crankshafts, trochoidal chamber, chains, nor belts. (While no claim can be made on missing parts, the fact that such conventional parts are missing is one of the reasons that make this invention different from prior arts, and, therefore, it is so listed.) The preferred embodiment, comprising multipurpose rotors, paired dams, combustors, turbines, etc., could be made small enough to run a lawn mower or large enough to fly a big air plane. It uses a modified form of combustors, wherein combustion takes place amid ample air, thus promoting a fuller combustion of fuel at a lower temperature than in conventional rotary and reciprocating piston engines. Consequently, this invention has a surprisingly low amount of CO, $NO_x$, and unburnt hydrocarbons in its exhausts. Each rotor has a compressing head, oil reservoir, turbine blades protruding from its radial side, and cooling means in its central part, and serves as a compressor, flywheel, lubricator, engine cooler, and turbine. Exactly at the end of each compressing cycle, each rotor releases its compressed gasses to the combustors, wherein gasses are either mixed and ignited, or directly ignited. The resulting expanding gasses passing through the combustors' exhaust nozzles strike the turbines, causing the latters to spin. Each turbine is attached to a rotor's radial side, and each rotor, in turn, is keyed to the central power output shaft.

10 Claims, 22 Drawing Figures

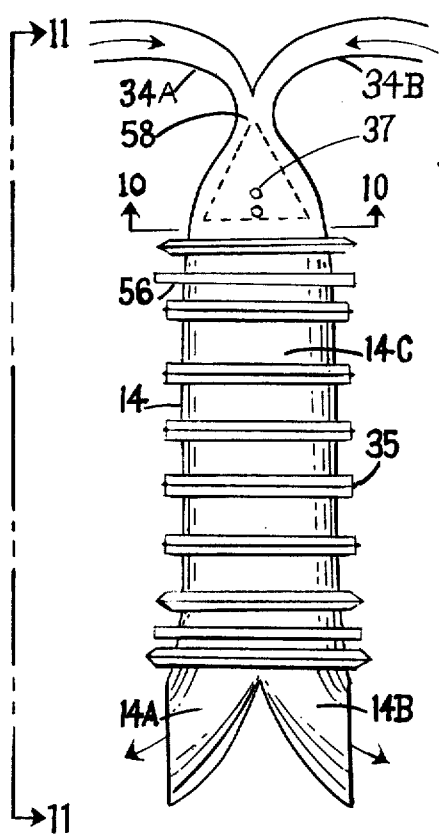
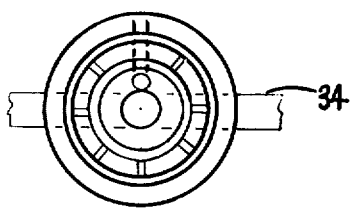
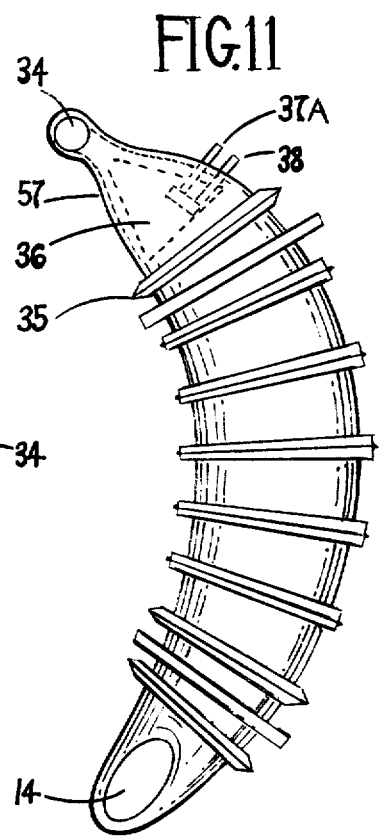
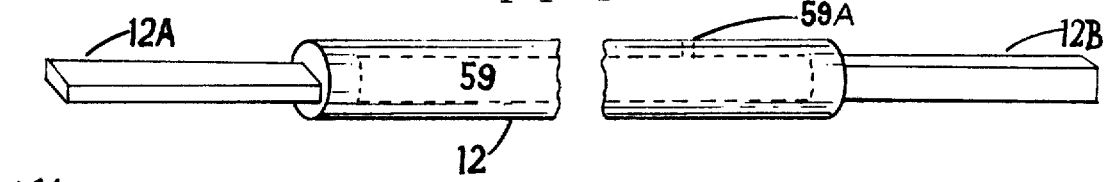
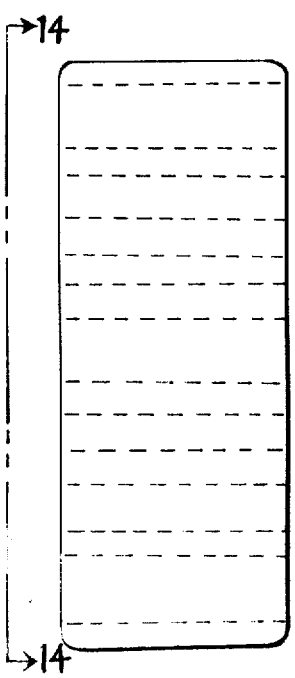
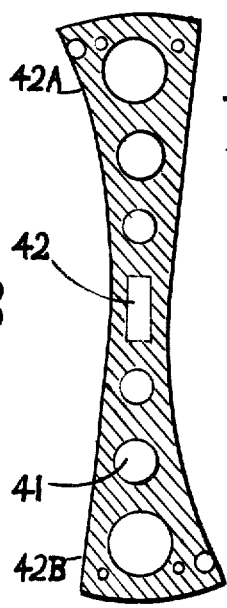
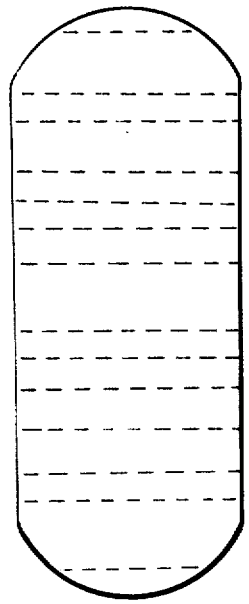

ROTARY ENGINE

SUMMARY

The present invention relates to a rotary engine that has the good features of rotary and air-breathing turbojet engines, but without the off-centered geared rotating parts, jet disturbances, space taking axial and radial compressors, and cumbersome heat exchangers. It has fewer mechanical parts than the majority of the conventional hot-air, free piston, gas turbine, and reciprocating piston engines, and consequently it is lighter and takes less space than the majority of such engines of comparable power. It is designed so that it could be constructed small enough to run a lawn mower, or large enough to power a car, a boat, or an electric generator of considerable size.

In designing the present engine, I have kept foremost in mind a power source that will not become a threat to the environment. It is well known that the conventional off-centered rotary, free piston, and reciprocating piston engines have too much of the three major pollutants in their exhausts: (1) carbon monoxide and (2) unburnt hydrocarbons, which are due to a great extent to the incomplete combustion of fuels, and (3) nitrogen oxides which are caused by too high a combustion temperature that is very difficult or impossible to avoid in such engines. It is also known that the combustions in the combustors of gas turbine and turbojet engines are fuller and occur at a lower temperature than in the very limited combustion spaces of the conventional off-centered rotary and the reciprocating piston engines because more combustion supporting air and space are available in the formers, and consequently there is very little carbon monoxide, unburnt hydrocarbons, and nitrogen oxides in the exhausts of combustor-equipped engines.

By using a new type of combustor, this invention provides a comparatively large amount of air and space to sustain a fuller combustion at a lower combustion temperature than are possible in the limited combustion spaces of reciprocating piston and off-centered rotary engines now on the market, thereby keeping the amount of carbon monoxide, unburnt hydrocarbons, and nitrogen oxides in its exhausts at a very low level that could hardly become a serious threat to environment.

The present engine is made in a substantially cylindrical configuration, which comprises, among others, a casing that is divisible into two cylindrical parts, a pair of rotors that move in separate but parallel paths, paired dams or gates, and combustors.

The two rotors, with a stationary cylindrical power chamber sandwiched between them, are keyed to a common power output shaft. The forward wall of each rotor serves as the piston head, and the heads of the two rotors are separated from each other by 180°, which means that each piston head will reach a given dam or gate in its path at a time different from that of the other. Besides being a compressor, each rotor has a central section that serves as an engine cooler and ventilator, a peripheral part that contains an oil reservoir that serves as a supplier of lubricants to the various contacting surfaces, a circle of turbine blades protruding perpendicularly from its radial side, and sufficient weight that could make it function as an energy conserving and rotation equalizing flywheel.

The said stationary power chamber contains the combustors, and separates the paired dams and the paired rotors into the left and the right dams, and the left and the right rotors. Each rotor's piston head compresses gasses in its enclosed path against a leak-proof gate called dam. A dam is mounted and securely attached to each end section of a common shaft with the plane of each dam securely fixed in a position perpendicular to that of the other. Consequently, if the right rotor's piston head, after completing its side of the compression, pushes the right dam into a horizontal or open position so that it could pass under it, the left dam will, at the same moment, become vertical or closed so that the left piston head could compress gasses in its path against the closed dam, and vice versa. By virtue of the said perpendicularity of the paired dams and the way the parts, the dams' shaft in particular, are structured and arranged, the said dams open and close at the right time without any human or electronic help.

Compression increases as each piston head approaches a closed or vertical dam, and at the maximum or near maximum compression, the outlet ports in each rotor's radial side, by virtue of the rotor's rotation, align with the openings in the stationary passageways that lead to the power chamber, thus giving the compressed gasses smooth channels that lead into the combustors.

At low or lower medium speed, the combustors fire at regular or comparatively short intervals, but the rotation of the output or power shaft continues to be comparatively smooth due to the rotors that double as flywheels. At the upper medium and high speeds, the intervals between the compressions and firings become so short that the resulting rotation of the engine, for all practical purpose, will be very near or about the same as those of the continually firing jet engines.

The said combustors use compressed air and mix it with fuel, or use compressed mixture of air and fuel, or even hydrogen. Ignition takes place in the cone located in the paraboloidal nose of each combustor. The resulting expanding gasses or jet strikes the turbines mounted and attached to the radial side of each rotor, which is keyed to the central power output shaft. Thus, the kenetic energy of the expanding gasses is converted directly into usable rotary motion.

DETAILED DESCRIPTION

For a fuller description of the parts, assembly, and operation of the said engine, references are made to the following specification and to the accompanying drawings wherein like reference numbers are utilized to refer to identical components throughout the several drawings. It is understood that this invention is not to be construed as limited to the particular forms described or illustrated herein, since the forms were chosen for the purpose of the disclosure, and, therefore, should be regarded as illustrative rather than restrictive.

REFERRING NOW TO SAID DRAWINGS.

FIG. 3 is a turbine blade viewed from the peripheral side of the rotor.

FIG. 4 is cross-sectional view of the turbine blade, while

FIG. 7 is an isometric view of the power chamber, while

FIGS. 9, 10, and 11 are detailed views of the combustors.

Figure 16:
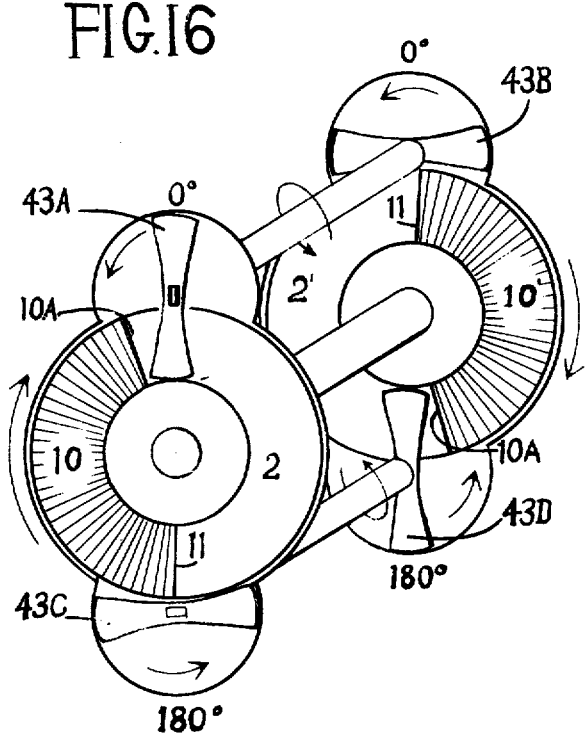
Figure 17:
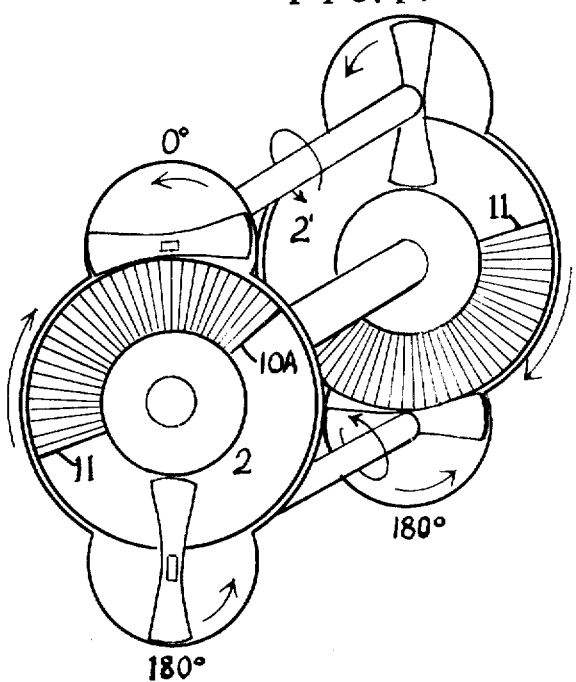

FIG. 12 is a view of the dam shaft. FIGS. 13 and 14 show views of the dam. FIGS. 16 and 17 are schematic outline intended to explain how the compression of gasses is accomplished in the preferred embodiment.

Figure 18:
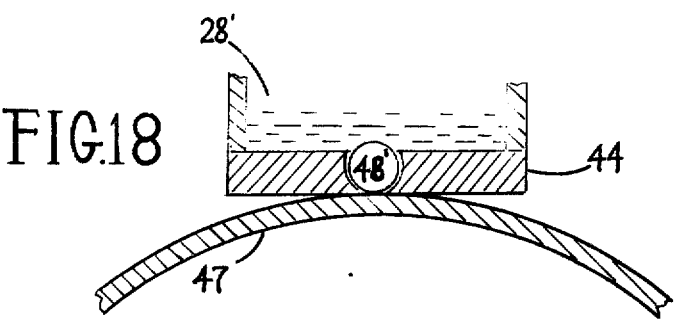
Figure 19:
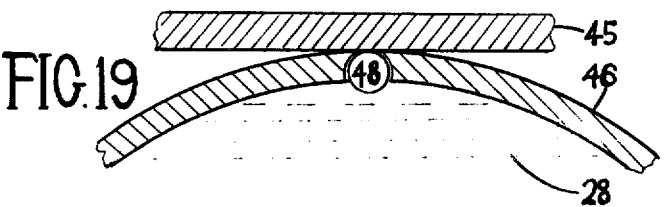
Figures 20, 21:
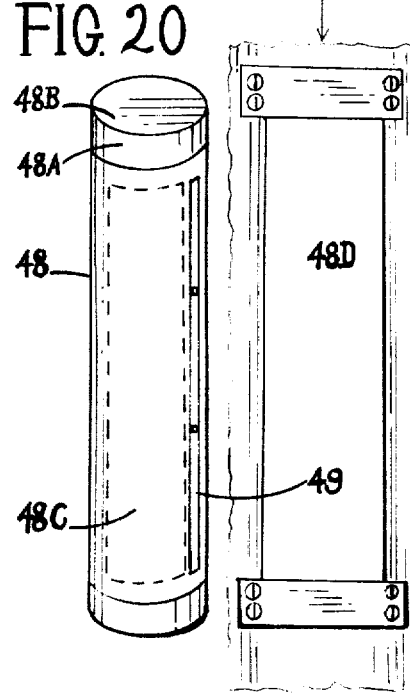

FIGS. 18 and 19 show the several positions of the lubricating device: 44 represents a stationary lubricating device and 47 a rotating part that is to be lubricated; 46 is a rotating lubricator while 45 is a stationary part that is to be lubricated. FIGS. 20, and 21 are detailed views of the lubricating device.

Figure 22:
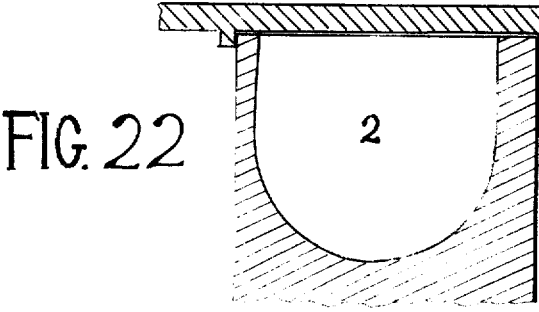

FIGS. 15 and 22 are alternate shapes of the dam and the compressing chamber.

CASING

Figure 1:
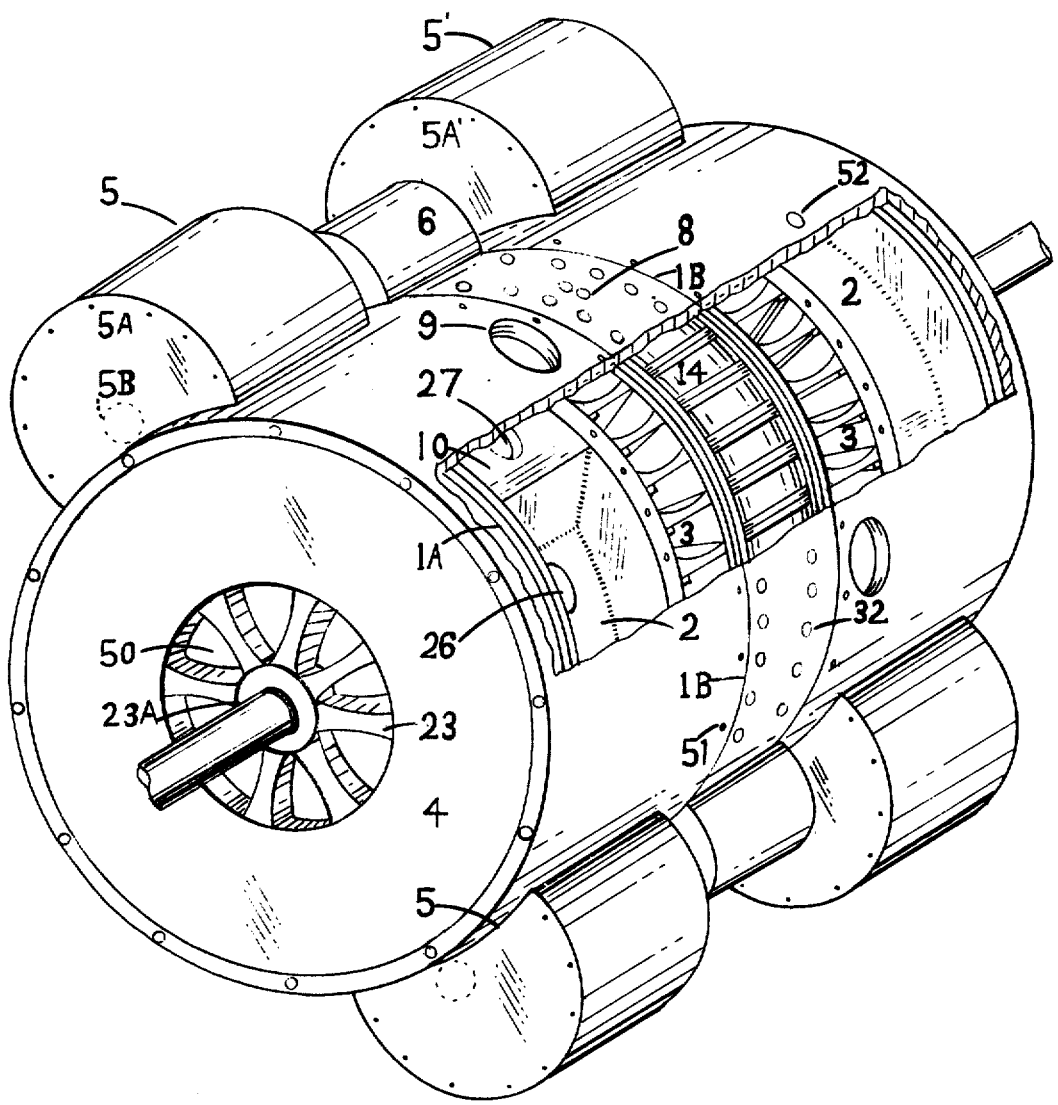
FIG. 1 shows an isometric view of the engine as a whole.
Figure 2:
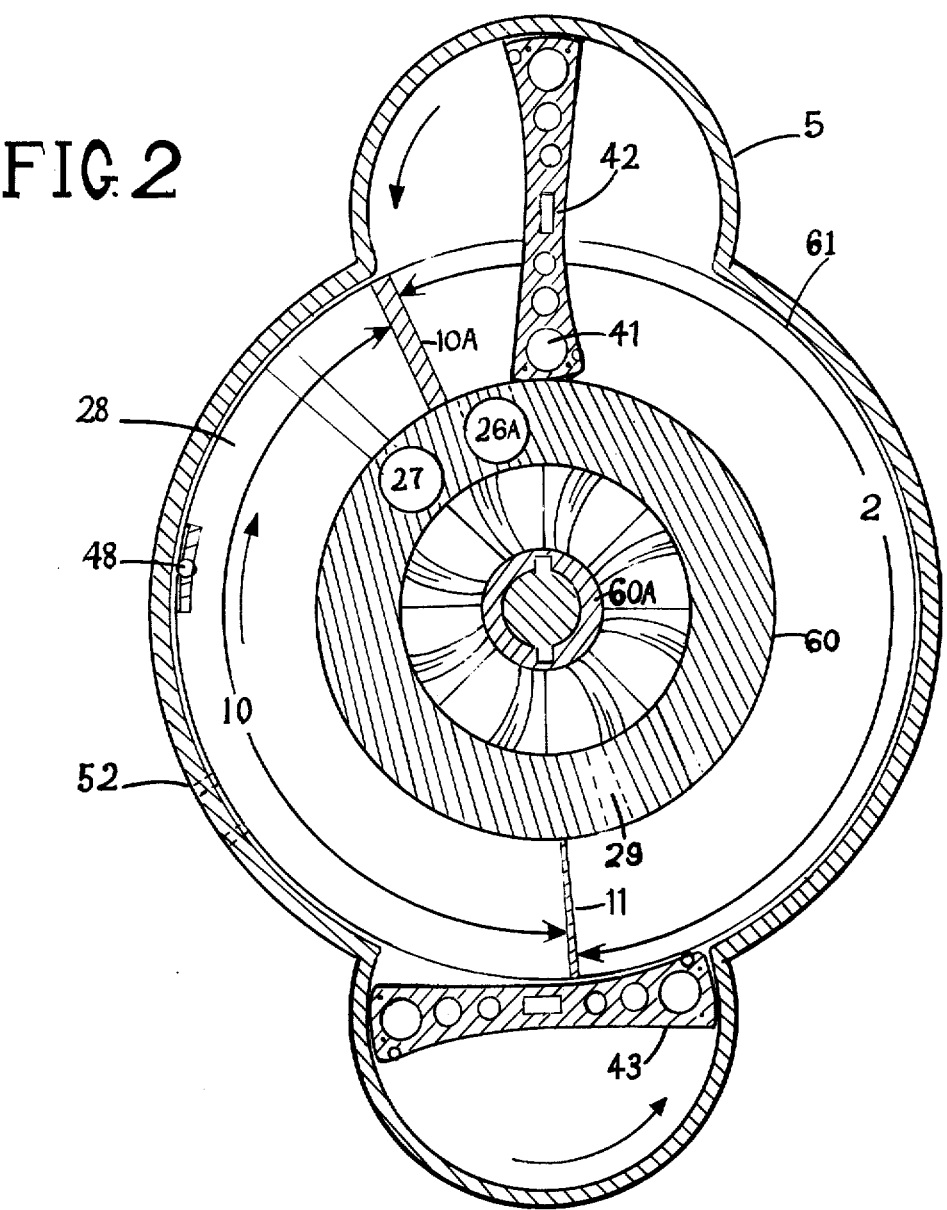
FIG. 2 shows a cross-sectional view of the rotor and the dams.

The casing of this engine is constructed in a substantially cylindrical shape, and is designed to be divisible into two equal or nearly equal cylindrical parts. (FIG. 1) The radial wall of each half of the said casing is constructed in the form of a wheel that has a wide felly-like part 4, which is joined and held securely by a plurality of evenly spaced spoke-like members 23 to a hub-like part 23A that is made to retain roller bearings for supporting one end of the central power output shaft.

Each of the said half-casings has two substantially semi-cylindrical extensions 5, separated from each other by 180° as measured between their means, on its outer cylindrical surface. Each of the said extensions has its axis well above the outer cylindrical surface, and parallel to that, of the said half-casing. Sections of the said extension's radial walls are cut away along a curved line that matches the curvature of the said cylindrical half-casing so that the said extension could sit evenly on, and be welded to, the said half-casing. The radial walls 5A of the said extensions are detachable, and have circular holes (5B) bored through them at the loci corresponding to their axes.

A ring-shaped internal flange 1A, having a maximum diameter equal to the inner diameter of the said half-casing, and having its radial side parallel to, but separated by a narrow margin from, the radial wall 4 of the said half-casing, extends from each half-casing's inner surface towards its axis for a distance of about an inch as an added welded member of said half-casing.

Evenly spaced holes for bolts 51 are made around the margin close to the open side 1B of the said half-casing, and one or more exhaust ports 9 are bored in the same section, but slightly removed from said margin.

Port for intake of gasses 52 is located in that part of each half-casing's peripheral wall that lies immediately above the path of each compressing chamber, and ports for lubricants are located in that part of each half-casing's peripheral wall that lies above the path of the piston.

Suitable conventional bases and attachments (not shown in drawings) to maintain the equilibrium and the stability of each half-casing before union, and the whole casing after their union are provided.

HEAT AND WEIGHT REDUCTIONS FEATURES

Before proceeding further, I shall describe the heat and weight reductions features of the important parts of this engine. Ports 53 are bored in each of the inner cylindrical extensions 31 of the power chamber to draw in air from the centrally located tunnel 50 of the wheel-like section of the engine. Cooling air is drawn into the spaces among the turbines' blades, and by virtue of the centrifugal reaction caused by the fast spinning turbines, the exhausts from the combustors, mixed with cool air from said tunnel, are forced through the exhaust ports 9 with sufficient force to run a generator. In the drawing, the external exhaust tubes, which are present on the engine, are not shown since the word "tubes" is in itself a sufficient guide for one skilled in the art to make them.

To protect the turbine blades from being bent indirectly by heat, a large ring 18 made of refractory alloy and a small ring 18A of the same alloy are securely fastened to the upper and the lower free sides, respectively, of the blades.

Unlike those in some conventional rotary engines, combustions do not take place in the compressing chambers of this invention, and overheating of its chambers' walls is quite remote. Nevertheless, holes for air are bored in the rotors' thicker walls that support the turbine blades. The holes start from the rim 16 of each rotor down through to the said air tunnel.

The weight of one of the engine's most important components, the dams, is reduced by at least 50% by a large number of holes 41 bored through the sides of each dam 43, which holes made to run parallel to the axis of each rotor (in their assembled relation) to prevent the leakage of gasses in the compressing chamber.

CYLINDRICAL POWER CHAMBER

The cylindrical power chamber is stationary. It has an outer diameter substantially equal to that of the engine's casing. In its assembled position, it has its radial walls parallel to those of the said casing. By its position in the middle of the engine configuration, it separates the said casing into the left and the right half-casings, and at the same time holds securely the said two half-casings unto itself by means of hollow cylindrical extensions 19 of its radial sides that penetrate into the open ends 1B of the said half-casings to be bolted thereto.

The cylindrical power chamber is constructed in two sections bolted together. Its central section 54 is made in the form of a cylindrical wheel that has a hub-like part with roller bearings for the support of the engine's power output shaft, a felly-like part, and a plurality of evenly spaces spoke-like members that rigidly and securely join and hold the said hub-like part to the said felly-like part. Attached to the said central section is a peripheral section 55 constructed in the form of a circular chamber that completely encircles the said central section. The said chamber has a generally rectangular cross section.

In the preferred embodiment, the said circular chamber contains two identical combustors 14, each occupying a position diametrically opposite of that of the other. Each combustor, securely held in position by aft and forward bulkheads 56, has bifurcated exhaust nozzles 14A-B, a substantially cylindrical midsection 14C, and a paraboloidal nose section 57 containing a securely held cone-shaped diffuser 36. The vertices 58 58" of the diffuser and the paraboloidal section have air and fuel intake ports and are pointed in a common direction. Close to the said ports, in and through the said paraboloidal and cone-shaped walls, are openings 37 38 for fuel line and electric wiring. The fuel nozzle is located in the said cone, but at a point 37 down stream from the said vertex, and and its fuel line 37A goes through the said openings to an outside source of fuel supply. The electric ignitor 38 is located close to the said nozzle on the downstream side, and its wire goes through the said opening to a source of power. Currently available fuel injection and electronic ignition devices are used.

The combustor's bifurcated nozzles 14A-B, which penetrate the said chamber's radial walls 55A are aimed at the turbines 3 attached to the radial walls of the rotors (to be described in the next section).

Each of the said combustors has single-layered wall with a plurality of fins 35 mounted on its outer surface and made to encircle the generally cylindrical body. Unlike the conventional combustors that rely heavily for their cooling on already heated air (from their compressors and heat exchangers) circulating between the hot spaces of their double-layered or multiple walls, the combustors of this invention rely on the direct cooling effect of unheated ambient air entering through numerous ports 32,53 and circulating around and among the said fins 35.

The said power chamber has a hollow cylinder (30 protruding perpendicularly from each of its radial sides as its added and welded extension. Each of the said hollow cylinders has its unattached end or side open, and its axis aligned in a straight line with that of the said chamber. The outer diameter of the said hollow cylinder is almost equal to, but slightly less, that that of the inner diameter of the aforesaid half-casing. During the final stage of the assembling of the various parts, each of the said hollow cylindrical protrusion is pushed into the open side of each half-casing, and bolted thereto.

Located inside of each of the said hollow cylinders is a smaller, but very thick walled hollow cylinder that protrudes perpendicularly as an added and welded protrusion of each radial wall of the said power chamber. Each of the said smaller cylinders 31 has its axis aligned in a straight line with that of the said power chamber, and has its very thick rim abutting the nearest radial wall of the assembled rotor.

At this point, the relative terms "left" and "right" are introduced, not as permanent designations of the two smaller cylinders, their passageways, and their positions, but merely to avoid confusions in descriptions and understanding thereof.

Two pairs of passageways for compressed gasses start from the thick rims of the two smaller hollow cylinders. The first passageway 34 of the left pair starts from an opening 33 in the flat radial surface 31A of the rim of the left cylinder 31, and runs axially between the outer 31B and the inner 31C surfaces of the thick cylindrical wall, through the left radial wall 55A of the power chamber, and joins with the first passageway right of the right pair that has followed an identical, but opposite, path from the right cylinder located on the right side of the said power chamber, and together they communicate with a channel 34B that leads into the first of the said combustors, while a second passageway 34A of the left pair starts from an opening in the flat radial side 33 of the same rim of the left cylinder, but at a point 180° from that of the first as measured between their medians, and follows a nearly parallel path through the walls and joins with a second passageway of the right pair right that has also followed the oppositely located identical path from the right cylinder, and together they communicate with a channel 34B that leads into the second combustor 14.

Each of the said openings in the radial side of the rim of each of the smaller cylinder is made arcuate in shape to permit the round openings in the radial side of each rotor to have adequate time to pass their compressed gasses into the opening of a stationary rim. The said arcuate opening has a width about three-fourths of the thickness of the said rim, and extends at least 50° radially in the smooth radial side of said rim. The said arcuate opening gradually constricts into a round shape as it extends into the cylindrical wall.

In the peripheral surface of the said power chamber are two fuel intake ports 8, each located diametrically opposite of the other and communicates with a tube leading into each combustor. The terminals of ignition means are also located in the same areas, but separated from the fuel intake ports. Except in the radial walls facing the turbines, numerous ventilating holes 32 are bored at random in the said chamber's walls. Evenly spaced holes for bolts 51A that align with those found in the margins of the open sides of the said half-casings are made in the peripheral wall of the larger cylindrical protrusions 30.

Two substantially semi-cylindrical extensions 6, separated from each other by 180° as measured between their medians and having their axes positioned parallel to that of the casing, protrude from the peripheral cylindrical surface of the said chamber as extensions of the said surface and wall. Each of the said substantially semi-cylindrical extensions has a comparatively large hole bored in and through the full length of its axis 6A, the said hole equipped with roller bearings and related parts and positioned above, meaning outside, the curved peripheral surface of said wall.

All parts in the said power chamber, the combustors in particular, are made substantially arcuate to conform to the walls of the said chamber.

COMPRESSING MECHANISM

Rotors and dams are used in this invention to compress gasses for ignition. This engine uses toroidal compressing chambers, round pistons, and round and oval dams for its special models to meet special requirements, but in the average model, the preferred embodiment, the compressing chambers and the pistons have "substantially square" cross sections, and the frontal shape of the end sections of each dam is also "substantially square," which term as used in this application means a square with at least two of its four sharp corners rounded to some degree to make the movements of the contacting parts smooth, and not a plain "square" that has four sharp corners.

Fuller descriptions of the said dams and rotors follow next.

PAIRED DAMS

The word "dam" as used herein denotes a generally rectangular body with seals in its sides that effectively holds back liquids and gasses, and prevents such fluids from flowing away from a given section of the engine.

This invention uses one paired-dams unit for a small engine. Each paired-dams unit is enclosed in a substantially semi-cylindrical twin housings 5 attached to the peripheral cylindrical surface of the engine's casing.

There is no limitation on the number of paired-dams units, but for vehicles and small airplanes, two paired-dams units appear to be adequate. The preferred embodiment used herein as an illustration for the disclosure has two paired-dams units (FIG. 16) which are securely installed on the peripheral wall of the engine's substantially cylindrical casing, each unit separated from the other by 180° as measured between their medians.

Each paired-dams unit has a comparatively long shaft 12 constructed in one piece, but has three sections: a cylindrical middle section 12' that is rotatably held in the axial passageway of the semi-cylindrical extension 6 of the peripheral wall of the aforesaid power chamber, a rectangular left section 12A that extends over the said assembled left rotor, and a rectangular right section 12B, whose flat planes are perpendicular to those of the left section, extends over the said assembled right rotor.

Each member of each paired-dams unit is constructed in a single piece, but also divisible into three sections: a middle section 42 designed to hold the said rectangular section of the shaft, and two end sections 42A-B, each having a substantially square outline that could fit transversely into the said compressing chamber of each rotor. The surface of the dam's each end section that must face in the direction of the dam's rotation is made concave or curved so that it could conform to the curvature of the contacting surface of the said assembled rotor, and the section's other side made flat and straight. Rollers are rotatably held in each dam's curved surfaces. Each dam has a slot bored through its midsection in a straight line parallel to its flat plane, the said slot being of the size and shape that could admit the aforesaid rectangular section of the said shaft.

When the said rectangular sections of the dam's shaft are inserted and securely held in the said rectangular slots 42 of the dams, the plane of the left dam 43 will become perpendicular to that of the right dam 43A because the planes of the end sections of the dam's shaft 12A-B are perpendicular to each other.

Each dam extends over each rotor, more specifically, the compressing chamber. When a dam is in a vertical or closed position, its one end will be in the compressing chamber and closing a section of the latter, but when the dam is in a horizontal or open position, it will lie above the said chamber, and the piston could pass under it. Each member of the paired-dams unit remains in a horizontal position during the moments any part of the rotating piston is under it and keeps it from turning, which state, in turn, keeps the opposite dam in a vertical or closed postion during the same moments so that the opposite piston could compress gasses against it.

When the left dam, for example, is pushed into a horizontal or open position by the left piston head at the proper time, the right dam, by virtue of the aforesaid perpendicularity instantly becomes vertical or closed so that the right piston head could compress gasses against it, and vice versa.

The interior of the said housing for each dam is made with considerable precision, and each dam fixed to its shaft could spin with its sides in close or sliding contact with the internal surface of the housing. An oil reservoir is created in the interior of the cylindrical section of the shaft of each paired-dams unit. The said reservoir 59 has an inlet for direct replenishment of oil 59A, and several outlets that lead into the said twin housings.

ROTORS

The engine is normally equipped with one pair of rotors. For a very large engine, several pairs may be used.

The central section of each rotor is a cylindrical wheel-like body 60 resembling that of the power chamber described earlier, and consists of a felly-like part, a hub-like part, and a plurality of spoke-like members that join and hold rigidly and securely the felly-like rim to the hub-like part 60A.

The peripheral section 61 of the rotor may be described as a ring-like chamber that has a substantially square cross section, and that completely encircles and securely holds the said cylindrical wheel-like section. The said peripheral section is divided into a hollow piston 10, which occupies about 160°, and the compressing chamber 2 the remainder 210°. The forward wall 10A of the hollowed piston, the side facing in the direction of the rotor's rotation, is made very thick since it serves as a piston head and dividing wall between the hollowed piston and the tail-end of the compressing chamber. The tail-end of the said piston is separated from the front side of the compressing chamber by a less thick wall 11.

The said compressing chamber has three walls, not counting the two transverse walls that separate it from the piston. Its peripheral wall, is missing. The function of the missing wall is supplied by the contacting surface (inner) of the engine's casing. Near the forward side of the compressing chamber, in the walls that separate the said chamber and the central wheel-like section, are air-intake ports 29 that communicate with the air spaces among the spoke-like members of the rotor. The said spoke-like members are made slightly concave in the direction of the rotor's rotation, and curved a little in the manner of fan blades to help channel ambient air into said compressing chamber, and also into the centrally located power chamber. Ports for air and other gasses 8 are provided in the engine's casing for direct injection into the compressing chamber.

The hollow piston section 10 is supplied with all the walls, and its interior serves as an oil reservoir 28, which has plugged openings in its wall that align with threaded openings in the casing, and a plurality of small openings facing the surfaces of the parts of the engine that touch the rotor.

A radial wall of each rotor 16, the wall that faces the power chamber when assembled, is made very thick, and a plurality of evenly spaced grooves and perforated ribs that run perpendicularly to the rotor's axis radiate toward the wall's peripheral border. Turbine blades are anchored in the said grooves and bolted to the said ribs. The said turbine blades 3 protrude in the direction of the radial side of the said power chamber, but without touching any part of the latter.

Two outlets for gasses(compressed) originate in different parts of the rotor. One passageway 26 for compressed gasses starts from the floor of each compressing chamber, close to the piston head, enters the thick felly-like part of the central section, turns in the general direction of the assembled power chamber, and terminates in the radial side 26A of the said felly-like part at a level where its opening could align with an opening of a passageway that leads into the power chamber. The second is a one-way tube 27 that drains the compressed gasses in each of the said dam housings. The tube goes through the oil reservoir of each rotor: one open end is located in the peripheral wall of the hollowed piston and is covered by the inner surface of the engine's casing, but uncovered when passing under the dam's housing, and the other end penetrates about half way into the felly-like part of the central section, and turns in the general direction of the assembled power chamber and terminates as an opening in the radial side of the said felly-like part 26B at a level where said opening could align and communicate with an opening of a passageway that leads into the power chamber.

The piston heads of the paired rotors are separated from each other by 180 degrees as measured between their medians, and the rotors are keyed to the same power output shaft.

HOW THE GASSES ARE COMPRESSED BY THE ROTORS AND THE DAMS

The relative terms that cannot be nailed down, namely, left, right, and clockwise, are used in the following, not as permanent designations, but merely for the purpose of making the descriptions less involved and to avoid confusions that are likely to occur due to the presences of several sets of paired parts. The said terms are used and are valid within the frame of reference of the drawings, i.e., FIGS. 16 and 17. Only the locations of the paired dams-units are designated permanently as 0° dam-unit and 180° dam-unit according to their positions on the periphery of the engine's casing.

Compression of gasses is accomplished not by the mutual movement toward each other of the piston and the compression chamber, which movement cannot occur, but by the movement of the piston against a closed dam that abuts in the compressing chamber.

Referring to FIG. 16, it is seen that the plane of the left dam is perpendicular to that of the right dam. Since they are mounted securely on the same shaft, no matter how often they are turned they will continue to be perpendicular to each other as long as their mountings remain secure. When the left dam is pushed into a horizontal or open position, the right dam becomes vertical or closed, and vice versa.

In FIG. 16, the piston head 10A of the left rotor has almost completed the compression of gasses in its path against its left vertical or closed dam at 0° dam-unit 0°, while its tail end 11 is still under the left dam of 180° dam-unit. In the meantime, the piston head 10A of the right rotor is also approaching, and almost completing its compression against, the vertical or closed right dam at 180° dam-unit 180°, but its tail end 11 is still under the right dam at 0° dam-unit 0°.

Still referring to FIG. 16, the piston head 10A of the left rotor will not be able to pass clockwise its vertical or closed dam at 0° dam unit, as long as the right piston's tail end 11 at 0° dam-unit 0° keeps the right dam horizontal, and thereby causing the left dam at that point to remain in a vertical or closed position. At the same time, the piston head of the right rotor 10A cannot pass clockwise through its vertical or closed dam 43D at 180° dam-uni. as long as the tail end of the left piston is at the 180° dam-unit and keeps the left dam 43C at 180° dam unit in a horizontal position, and thereby causing the right dam to remain in a vertical or closed position.

It is clear that neither the left nor the right rotor's piston head could pass through its closed dam with a movement independent of that of the other. However, the two rotors could easily pass through their respective dams when they move together at the same time, at the same rate, and in the same clockwise direction.

Since the left and the right rotors are keyed to the same power output shaft and have to rotate together at the same time and rate in the same clockwise direction, the piston head of the left rotor could push its closed or vertical dam into a horizontal or open position at 0° dam-unit because at that same moment the tail end of the right rotor's piston 11 will be also moving clockwise away from the right side of the 0° dam-unit and permitting the dams to turn; and at the same time, the piston head of the right rotor could push open its vertical or closed dam at 180° dam-unit because at that moment the tail end of the left rotor's piston will also be moving clockwise away from the left dam at 180° dam-unit, and permitting the dams to turn. FIG. 17 shows the positions of the pistons after passing the dams.

Thus the rotor's two pistons and the two dam-units cooperate in compressing the gasses by opening and closing the individual dams at the right time without direct human and electronic helps.

TURBINE BLADES

Figures 3, 4:
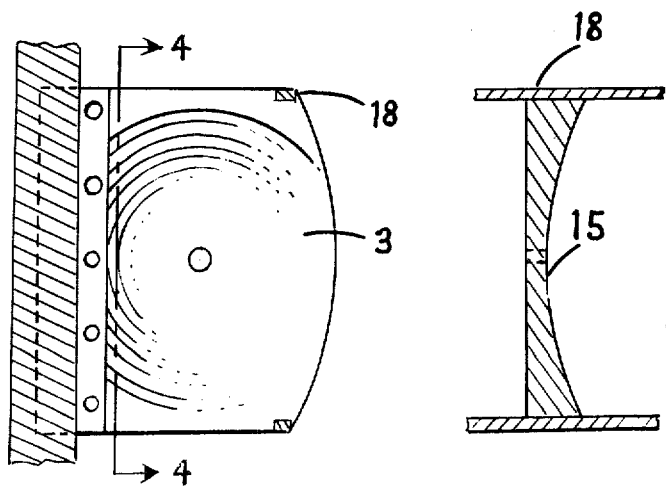
Figure 5:
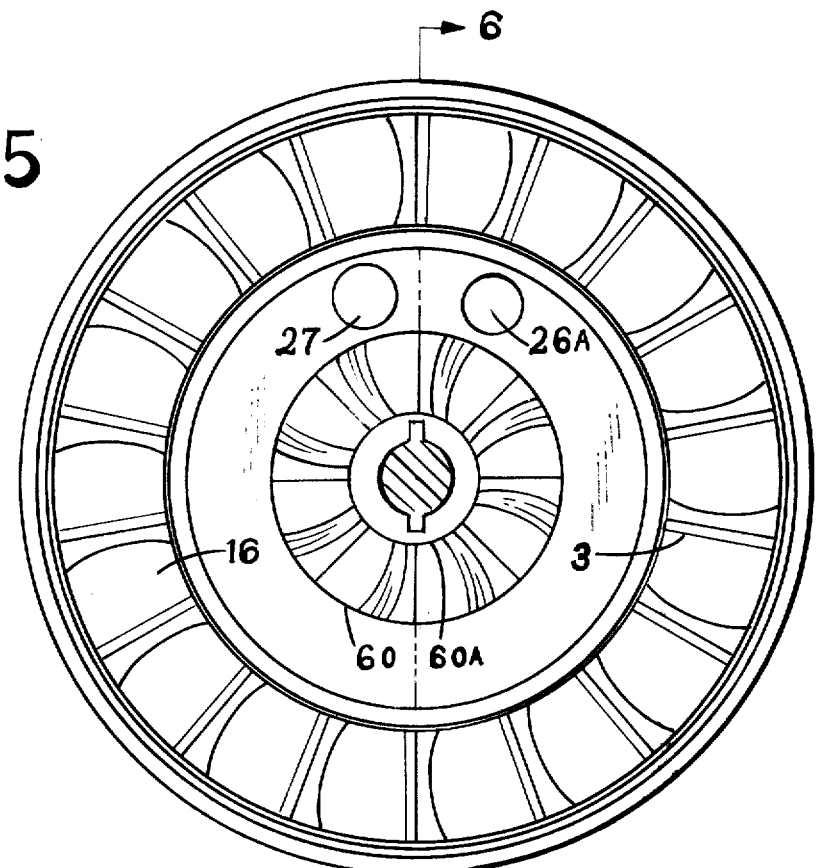
FIG. 5 is an elevation the view of the rotor and its turbine.
Figure 6:
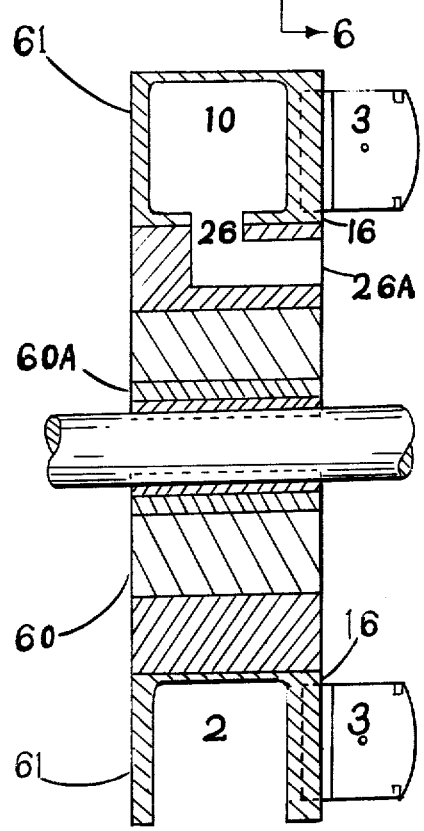
FIG. 6 is cross-sectional view of the rotor and the turbine.
Figure 7:
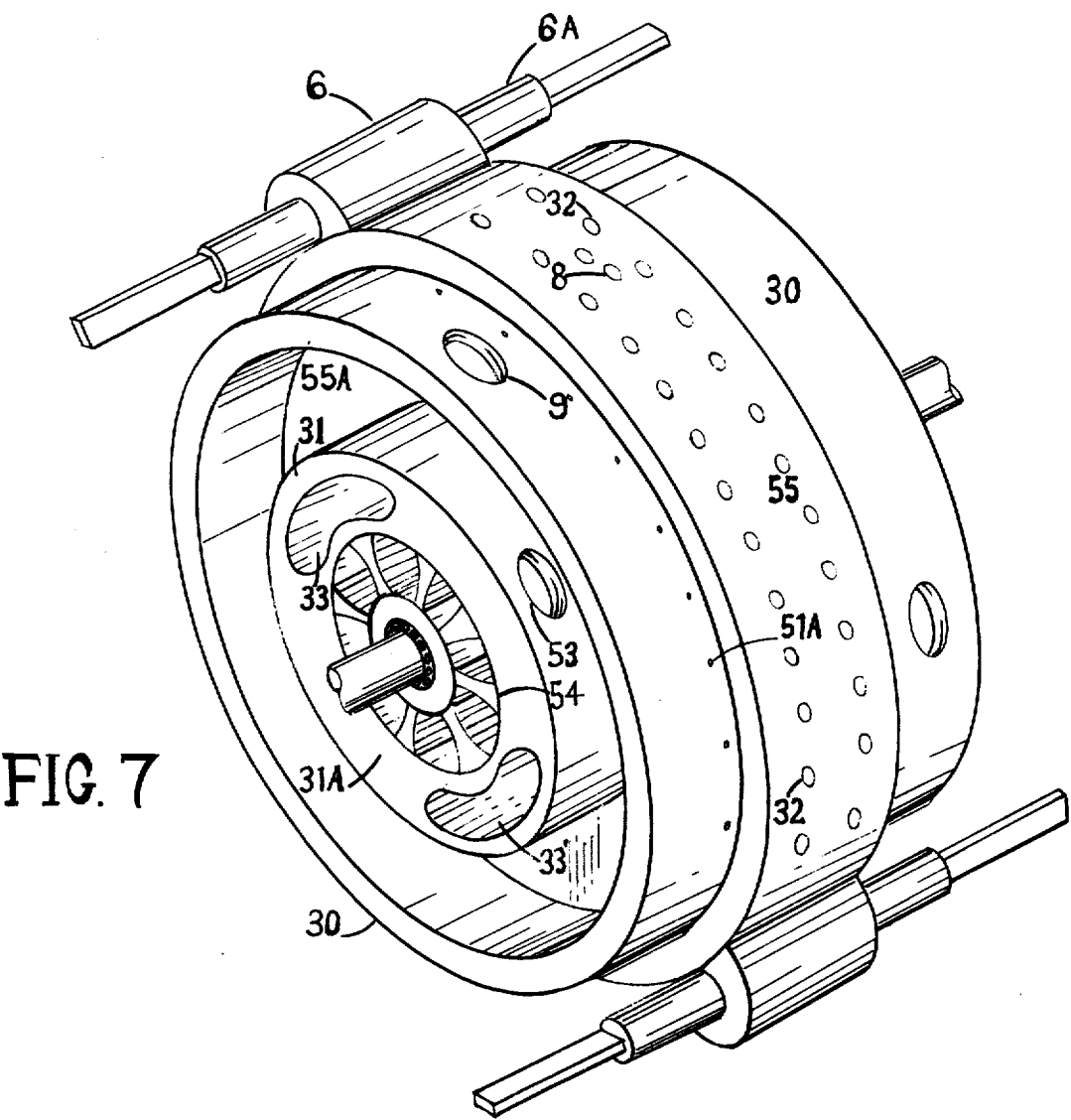
Figure 8:
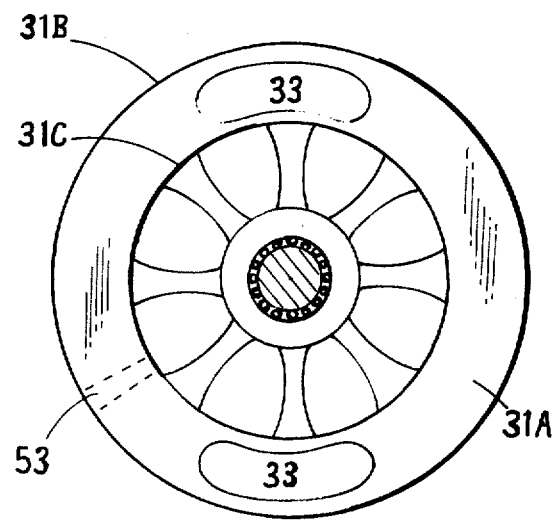
FIG. 8 is a schematic elevation view of one of the inner cylinders of the central power chambers.

The turbine blades of this invention depart considerably in form from those of the conventional types. Each of its blades is substantially rectangular, but has a shallow bowl-shaped depression in the surface that must face the blast of the combustors, and also has a small hole in the center of said depression. The depression is identified as 15 in FIGS. 3 and 4.

LUBRICATION

One of the engine's lubrication means consists of a handleless roller, rotatably held in the wall of the engine's oil containers 28. It is not worked manually. It utilizes a mechanical principle resembling, but not identical to, that of the ball-point pen, paint roller, and kitchen rolling pin.

It has (a) a cylindrical rod 48 that has a narrow, smooth margin encircling each of its ends 48A, several narrow grooves 49 extending longitudinally in its cylindrical surface but not touching the said end margins, radial sides whose surfaces having no protrusions nor identations 48B for any handle, and a cylindrical cavity 48C that extends longitudinally within the body and that communicates, through small openings, with at least one of the said grooves; and (b) a narrow rectangular opening 48D in the wall of the lubricant container, which opening extending in a straight line parallel to the axis of the rotor, and that has ball bearings and related parts in the recesses in both ends of the said opening. The part described in (a) hereof is inserted into the opening described in (b) hereof, the former being held rotatably in the latter. FIG. 21 shows an opening (for the lubricator) in the oil container.

In the unit thus described, when one surface of the said handleless roller is in contact with the lubricant in the interior of the said container, the diametrically opposite surface of the said roller will be in contact with the surface of the object to be lubricated. The lubrication itself is done by the rolling action of the said roller or cylindrical rod on the contacting surface, and the rolling is caused by the rotation and movement of one of the contacting parts. In the preferred embodiment, this type of lubrication means is found in the peripheral and radial walls of the rotors.

In addition to the above lubrication method, conventional lubrication is done through each of the said oil reservoirs' outlets in the rotors and the dam-units.

COOLING

The engine is cooled internally by ample flow of ambient air that goes through the wheel-like sections of the casing, rotors, and the power chamber. The spoke-like members of the rotors are slightly curved and resemble fan blades. They draw and force the ambient air toward the centrally located power chamber. Numerous holes are provided in the walls of the power chamber for the circulation of cooling air around the combustors.

ASSEMBLING OF THE PREFERRED EMBODIMENT

Except where it was self-explanatory, the assemblings of the various individual parts and units of the preferred embodiment have been described in reasonable detail under separate headings. Consequently, the assembling of the whole engine may be described succinctly and reasonably completely as follows:

(The terms "left" and "right" used hereafter in the senses and purpose previously described under "How The Gasses Are Compressed By The Rotors and The Dams.")

First. The central power output shaft is inserted through the hublike part of the power chamber. The parts of the shaft protruding out of the left and the right sides of the said chamber should be of equal length.

Second. The left rotor is placed on the left and the right rotor on the right of the said stationary power chamber, with their radial sides positioned parallel to each other and the power output shaft through their hub-like parts.

Third. The piston heads of the two rotors are turned until they are exactly 180° apart, the said degrees to be computed by using a definite point on the radial sides of the said power chamber.

Fourth. The two rotors are pushed towards the stationary power chamber until the rims of the latter's hollow cylindrical extensions touch the radial walls of the rotors. When thus positioned and aligned, being careful that the forward sides of the piston heads are still 180° apart, the two rotors are securely keyed to the power output shaft. In this state, the shaft held in the stationary power chamber's central bearings and the two rotors could spin in unison.

Fifth. The half-casings are then positioned: the left half casing, with the power output shaft in its central bearing, is pushed toward the rotor until the side of its ring-like flange in its inside wall 1A touches the rotor's left radial wall; and the right half-casing, with the said power output shaft in its central bearings, is pushed toward the rotor until the side of its internal ring-like flange is in close contact with the rotor's right radial wall. The two half-casings are then bolted to the cylindrical extensions 30 of the power chamber.

Sixth. The shaft of each paired-dams is inserted through the opening in each of the two semi-cylindrical extensings 6 located on the peripheral surface of the stationary power chamber, then through each detachable radial wall of the dams' twin housings 5A located on the peripheral surface of the engine's casing. Next, each rectangular end 12A-B of the said shaft is inserted into the rectangular opening 42 of each dam, and securely held therein. Finally, all the radial walls of the twin housings are placed in their proper positions, bolted and sealed.

HOW THE PREFERRED EMBODIMENT WORKS

Gasses are admitted into the compressing chamber 2 of each of the rotors through ports in the peripheral wall of the engine's casing. As to how the compression of gasses is accomplished in the compressing chamber by the actions of the pistons and the dams has been already elucidated in great detail.

It is suffice to say, however, that the piston located in the peripheral section of each rotor pushes the gasses in its enclosed path against a vertical or closed dam, and the compressed gasses are released through two ports of each rotor: one in the radial side of the felly-like part below the compression chamber, and the other in the radial side of the felly-like part below the piston. The said ports align at regular intervals during the course of the rotors' rotation with the stationary openings of the passageways that lead into the combustors.

If the compressed gasses entering the combustors are a mixture of fuel and air, they are directly ignited. If the compressed gasses entering the combustors are natural components of air, fuel is injected into them and the mixture ignited. The resulting expanding gasses pass through the bifurcated exhaust nozzles of the combustors and strike the turbines that are attached to the radial sides of the two rotors, which are, in turn, attached or keyed to the power output shaft. Thus, the kinetic energy of the expanding gasses is converted into a usable rotary motion.

The terms "compression chamber" and "compressing chamber" are used synonymously herein, and the terms "paired-dams unit" and "dam unit" are used interchangeably.

Although the invention has been described hereinabove with reference to a preferred embodiment, various modifications may be made without departing from the scope and spirit of this invention. It is my intention to cover in the appended claims all modifications of this invention that would appear to reasonable, prudent, and impartial individuals as within the scope and spirit of this invention.

Having thus described my invention in the above specification and having illustrated the same in the accompanying drawings, I hereby claim for the purpose of securing letters patent therefor, the followings:

1. A rotary engine which is designed to receive air and other gasses from suitable sources of supply, to compress and ignite such gasses, and to convert the kinetic energy of the expanding gasses directly into usable rotary motion, said engine comprising, in unique and useful combinations:

a. a casing that is constructed in a substantially cylindrical form, and made to be divisible into two substantially equal cylindrical parts;

b. at least one pair of rotors, each rotor having a central section that resembles a cylindrical wheel, a peripheral section comprising a pair of axially spaced annular walls extending radially from the periphery of said central section and cooperating therewith to define an annular chamber, two substantially radially extending partitions dividing said annular chamber into two subchambers, said one subchamber serving as an oil reservoir and rotary piston, said other subchamber serving as a compression chamber, and an arrangement of turbine blades located on one of said annular walls on the side opposite said annular chamber; the said rotors keyed to c. a central power output shaft that is mounted in the roller bearings of the hub of d. a stationary cylindrical power chamber, which, by its position, separates the said casing into two cylindrical parts, and the said paired rotors into two opposite, but parallel, rotating members;

e. at least one paired-dams unit that functions as a dam to hold back liquids and gases or retain such fluids in said compression chamber for, and during, the compression of such fluids, each unit enclosed in a twin housing that is mounted on, and attached to, the peripheral cylindrical surface of the engine's casing;

f. a plurality of passageways for compressed gases originating in the said rotors and communicating with channels that lead into the combustors;

g. a plurality of combustors housed in the said cylindrical power chamber, and having their bifurcated exhaust nozzles aimed at turbine blades mounted on a radial wall of each rotor;

h. a lubrication means, consisting of a handleless roller rotatably held in the wall of each rotor's oil reservoir and not activated manually, that uses the working principle resembling, but not identical, to those of the ball-point pen, paint roller, and kitchen rolling pin to spread oil and grease by a rolling action caused by one of the contacting surfaces; and i. a plurality of slightly curved spoke-like members of each rotor's wheel-like section that draw in ambient air in the manner of fan blades, and that cool the engine internally.

2. A rotary engine as claimed in claim 1, wherein the said casing is separable into two substantially equal cylindrical parts, and each half-casing comprising, in a unique and useful combination, a. a radial wall constructed in the form of a wheel having a felly-like part that occupies about one-half of the radius of the said wall, a hub-like part that has ball bearings for the support of one end of the said power output shaft, and a plurality of evenly spaced spoke-like members that join, support, and securely hold the said felly-like part to the said hub-like part; the said radial wall being securely attached to, and closing one end of b. a generally cylindrical section that houses a rotor and its turbine blades;

c. an internal flange in the form of a concentric ring, having an outer diameter substantially equal to the inner diameter of the said half-casing and separated from the inner surface of the radial wall of the said half-casing by a small margin, extending from the inner surface of the said cylindrical wall towards its axis for a short distance as a welded member of the said half-casing;

d. two substantially semi-cylindrical extensions, separated from each other by 180° as measured between their medians, protruding from the half-casing's outer cylindrical surface;

d1. each of the said extensions having its axis parallel to that of the rotor and well above (meaning outside) the curved peripheral surface of the half-casing;

d2. each of the said extensions having detachable radial walls with circular axial holes suitable for shaft bored through them at a level above (meaning outside) the peripheral surface of the half-casing;

e. intake ports for gasses in that part of each half-casing under which a compressing chamber must pass;

f. at least one exhaust port in its cylindrical wall near its open side, but not too close to the rim;

g. means for fastening its open side to the said power chamber.

3. The invention of a rotary engine as claimed in claim 1, wherein the said stationary cylindrical power chamber comprising, in a unique and useful combination, a. a central section constructed in the form of a cylindrical wheel that has a hub-like part with roller bearings for the support of the said power output shaft;

b. a peripheral section having an overall diameter equal to that of the engine's casing, constructed in the form of a circular chamber that has a generally rectangular cross section, and a hollow in the shape of a cylinder in its central area that is large enough to accept the said central section as a close fitting bolted member, the said circular chamber of the peripheral section containing c. a pair of identical combustors constructed arcuately, each combustor having a generally circular midsection, a paraboloidal forward section containing a cone-shaped diffuser and fuel and ignition means, and bifurcated exhaust nozzles aimed at turbine blades that are mounted on the radial side of each assembled rotor;

d. two hollow cylinders having their free ends open and their axes aligned on a straight line with that of the said central section protruding perpendicularly from each radial side of the said power chamber as welded members of the latter, d1. each of the said cylinders having an outer diameter almost equal to, but slightly less than, that of the inner diameter of the said half-casing, d2. the rim of each of the said cylinders when inserted into the open side of the said half-casing, abuts the section of the nearest radial wall of the assembled rotor closest to the rotor's periphery;

e. two thick walled hollow cylinders, smaller in diameter than those described in (d) hereof, having their free ends open and their axes aligned in a straight line with that of the said power chamber, extending perpendicularly from each radial side of the said power chamber as welded members of the latter, e1. each said cylinder positioned inside the larger cylinder described in (d) hereof, and ending at a point where the flat radial side of its rim touches the nearest radial side of the felly-like section of eaech assembled rotor, e2. each of said hollow cylinders having an outer diameter about equal to, but not smaller than, the maximum diameter of the said felly-like part of each rotor, e3. the rim of each of the said cylinder having two arcuate openings in its flat radial side, each opening located diametrically opposite of the other, communicating with a passageway having a round cross section that leads into the combustor;

f. two pairs of passageways for compressed gases (designated as the left and the right merely for the purpose of avoiding confusion) that start from the rims of the two hollow cylinders described in (e) hereof (also named as the left and the right cylinders for the same reason):
- f1. the first passageway of the left pair starting from the arcuate opening in the flat radial side of the rim of the left cylinder and running between the outer and the inner surfaces of the thick wall, through the radial wall of the power chamber, and joining with the first passageway of the right pair that has followed an identical, but opposite, path from the right cylinder located on the right side of the said chamber, and together communicating with a channel that leads into the first of the said two combustors, while a second passageway of the left pair starting from an arcuate opening in the flat radial side of the same rim of the left cylinder, but at a point 180° from that of the first arcuate opening as measured between their medians, and following a nearly parallel path and joining with the second passageway of the right pair that has also followed an oppositely located path from the right cylinder, and together communicating with a channel that leads into the second combustor;
- g. a plurality of fuel intake ports in the peripheral cylindrical surface of the said power chamber communicating with tubes that lead into the combustors;
- h. terminals of ignition means located close to the said fuel intake ports;
- i. exhaust ports in the peripheral wall of each of the hollow cylinders described in (d) hereof;
- j. means for holding securely the open side of each halfcasing to the said power chamber;
- k. numerous ventilating holes bored at random in the walls and extensions of the power chamber; and
- l. two semi-cylindrical extension having their axes parallel to that of the power chamber, and separated from each other by 180° as measured between their medians, protruding from the outer cylindrical surface of the power chamber as welded extensions, each semi-cylindrical extension having a circular hole bored in a straight line along its axis to retain rotatably a shaft of the aforesaid paired-dams unit.

4. A rotary engine as claimed in claim 3, in which there are two said paired-dams units positioned diametrically opposite of each other on the outer cylindrical surface of the engine's casing, and each unit comprising the components, and manifesting by virtue of a unique combination the distinctive appearances and useful movements described immediately under each such component, as follows:
- a. two dams (designated herein as the left and the right dams to avoid confusion) held on opposite sections of a common shaft, each dam constructed in one piece in a substantially rectangular shape, but functionally divisible into three sections: a middle section having a rectangular slot bored through it in a straight line parallel to its plane, and substantially square end sections containing numerous cylindrical cavities,
  - a1. the said end sections being of the size and shape that could fit into the said compressing chambers,
  - a2. the surface of each of the said end-sections that must face in the direction of the dam's rotation curved or made concave so as to conform to the curvature of the contacting surface of the assembled rotor, and the other surface made straight and flat, and
  - a3. each said end section holding rotatably a roller on its curved side;
- b. a comparatively long shaft constucted in one piece but having three sections: a cylindrical middle section that is rotatably held, when assembled, in each of the said semi-cylindrical extensions of the peripheral wall of the said power chamber, a rectangular left section extending over the assembled left rotor and into the the said rectangular slot of the left dam to be securely held therein, and a rectangular right section, the wider of whose planes made perpendicular to the corresponding planes of the left section, extending over the said assembled right rotor and into the rectangular slot of the right dam to be securely held therein,
  - b1. the surface or plane of a dam attached to one side of a dam's shaft becoming perpendicular to that of a dam attached to the opposite side of the said shaft by virtue of the perpendicularity of the two end sections of the said shaft;
  - b2. each dam being open during the moments it lies horizontally over the path of a piston, and closed during the time it assumes a vertical position in the path of a piston; and
  - b3. when the left dam is pushed under proper condition into a horizontal position, the right dam becomes vertical or closed at the same moment, and vice versa;
- c. a substantially semi-cylindrical twin housing, extensions of the engine's casing, with removable radial walls, enclosing each pair of dams,
  - c1. each member of the said twin housing having an internal space of the size and shape that permit the individual dam to turn with the dam's sides in close or sliding contact with the internal surfaces of its radial and arched walls; and
- d. stripes of seals having their longitudinal side held in grooves in, and a fraction of the said side protruding from, those parts of the dams requiring sealing engagement with the internal surfaces of the said twin housing and the said compressing chambers.

5. A rotary engine as claimed in claim 1, in which the said paired rotors are separated by the presence between them of the said cylindrical power chamber into opposite but parallel rotors, each rotor comprising, in a unique and useful combination, the following components:
- a. a central section constructed in the form of a cylindrical wheel that has a hub-like part that holds the central power output shaft to which it is keyed, a felly-like part, and a plurality of evenly spaced spoke-like members that rigidly join and hold the hub-like part to the felly-like part,
  - a1. the said spoke-like members made slightly curved so that in their rotation as central members of the rotor could effectively draw in ambient air towards the centrally located power chamber;
- b. a peripheral section constructed in the form of a circular chamber that has a substantially square cross section, and that completely encircles and securely holds with suitable means the said wheel-like section, the said peripheral section divided into a compressing chamber and a hollow piston;

c. a compressing chamber that occupies about 200° of the rotor's peripheral section and that has all the walls, except the outer one,
   c1. the function of said missing peripheral wall supplied by the contacting inner surface of the engine's casing;
d. an outlet passageway for compressed gasses that starts from the floor of the said compressing chamber close to the said piston head and that terminates in a round hole in the radial side of the said felly-like part at a level that it could align and communicate with the opening of a passageway that leads into the power chamber;
e. a piston that occupies that part of the said peripheral section not included in the said compressing chamber, and that has a hollow interior that serves as an oil reservoir, and separated from the compressing chamber by two thick transverse walls,
   e1. the said thick wall on the forward side of the piston (the side facing in the direction of the rotor's rotation) serving as the piston head, and
   e2. the said oil reservoir having outlets leading to the various contacting surfaces of each rotor;
f. a tube that runs through the hollowed section of the said piston with its open end covered by the contacting inner surface of the engine's casing, and uncovered when aligned with the open base of the said dam housing, and that has its other open end in the radial side of the said felly-like part at a level that it could align with an opening of a passageway that leads into the power chamber,
   f1. the said tube serving as a channel through which the compressed gasses accumulating in the dam housing could enter the power chamber to be used in the combustors;
g. a circle of turbine blades mounted on a radial wall of each rotor, each turbine blade anchored in the groove in said radial wall and bolted to fin-like projection located close to and along said groove.

6. A rotary engine as claimed in claim 3, in which the mechanism for compressing gasses comprising the following components that function as a combination:
a. the said paired rotors, separated from each other by the presence between them of the said power chamber into two separate but parallel rotating members, but keyed to the same power output shaft, each rotor having its piston head separated from that of the other rotor by 180°, and named as the left and the right rotors for the purpose of description;
b. a compressing chamber that occupies the major part of each rotor's peripheral section;
c. a piston, long and arcuate, that occupies that part of each rotor's peripheral section not occupied by the compressing chamber;
d. a piston head consisting of the thick forward wall (the side facing in the direction of the rotor's rotation) of each piston, the said piston head serving also as the separating wall between the compressing chamber and the long arcuate piston;
e. the said two paired-dam units, each unit located diametrically opposite of the other on the peripheral wall of the engine's casing, and designated according to their position as the 0° dam unit and the 180° dam unit, and each member of the unit named as the left or the right dam for the purpose of description;
f. each paired dam unit having its shaft rotatably held in the extension of the said power chamber, and having the shaft's one end section extending over the said compressing chamber of the left rotor and into, and to be held in, the rectangular slot of the left dam that is positioned vertically in, or horizontally above, the same chamber, and having the shaft's other end section extending over the compressing chamber of the right rotor and into, and to be held in, the rectangular slot of the right dam that is positioned vertically in, or horizontally above, the said chamber;
g. each dam positioned and mounted securely to its shaft to insure the perpendicularity of its plane in respect to that of the other, i.e., when the plane of the left dam is horizontal over the left compressing chamber, the plane of the right dam should be vertical in the right compressing chamber, and vice versa;

and the combination of the said components, in sharp contrast to a mere aggregation of hardwares, performing the following logical and useful movements that give to the physical appearance and description of the combination the necessary statutory elements that make it different from prior arts, to wit,
h. when the right dam is pushed at the proper moment into a horizontal or open position, the left dam will become, at the same instant, vertical or closed because of the perpendicularity of their planes;
i. compression of gases is accomplished by the movement of the said piston head against a dam that is obstructing a section of the said compressing chamber, and all the gases in the said chamber found between the advancing piston head and the momentarily stationary dam would be compressed;
j. the left dam at 0° dam unit remains closed in order to permit the left piston head to compress gases against it, and will remain closed, or locked as it were, as long as the tail end or any part of the long arcuate right piston is under the right dam at 0° dam unit and keeps the opposite or left dam in a vertical or closed position, and at the same time the right dam at 180° dam unit remains closed to permit the right piston head to compress gases against it and will remain closed or locked as long as the tail end or any part of the long arcuate left piston is under the left dam at 180° dam unit and keeps the opposite or right dam at 180° dam unit in a vertical or closed position;
k. neither the left nor the right piston head could pass through its closed dam with a movement independent of the other;
l. since the arcuate pistons are shorter than 180°, and since the two pistons, through their rotors, are keyed to the same power output shaft and must move at the same rate, at the same time, and in the same direction, when the piston heads get too close to their respective diametrically opposite closed dams, their tail ends will clear away from their respective diametrically opposite dams, and consequently the left dam at 0° dam unit opens for the left piston to pass through and the right dam at 0° dam unit closes so that the right dam could compress gasses against it, and at the same instant, the right dam at 180° dam unit opens to let the right dam to pass through and the opposite or left dam at 180° dam unit closes for the left piston to compress against it, and thus the dams open and close at the right time without human or electronic help and the compression is repeated.

7. A rotary engine as claimed in claim 1, wherein the said lubricating means comprising, in combination,
   a. a smooth cylindrical rod having a narrow smooth margin encircling each of its ends, several narrow grooves extending longitudinally in its cylindrical surface, radial sides whose surface having no protrusion nor indentation for a handle; the said cylindrical rod inserted and rotatably held in
   b. a narrow rectangular opening in the engine's lubricant container where the wall has been made thicker than elsewhere in or on the container, which opening extending longitudinally in a straight line parallel to the axes of the rotors and having ball bearings and related supporting parts in the recesses of its both ends; and
      b1. the unit thus assembled lubricating the contacting surfaces by a rolling action of the said cylindrical rod, which is in contact with both the oil filled interior of the container and the surface of the body to be lubricated, and which is activated by friction when one of the contacting bodies is in motion.

8. A rotary engine as claimed in claim 1, wherein one pair of said dams is used as a component of its gas compressing system.

9. A rotary engine as claimed in claim 1, wherein the extremities of each of the said dams are made substantially convex, and the floor or the bottom side of each of the said compressing chambers made substantially concave to match the dam's shape.

10. A rotary engine which is designed to receive air and other gasses from suitable sources, to compress and ignite such gasses, and to convert the kinetic energy of the expanding gases into usable rotary movement by channelling the rushing gasses against its turbines, but without the help of any internal gear, reciprocating parts, nor off-centered rotors, the said engine comprising in a unique, logical, and useful combination:
   a. a casing that is constructed in a substantially cylindrical form, and designed to be divisible into substantially equal cylindrical parts, the said casing housing
   b. a plurality of rotors, each rotor having
      b1. a central section made in the form of a cylindrical wheel which has spoke-like members that are slightly curved in the manner of fan blades,
      b2. a peripheral section consisting of a compressing chamber that occupies more than 180° of the said section, and an arcuate piston that occupies less than 180° of the said said arcuate piston containing an oil reservoir, section, and
      b3. a thick radial side that has a circle of turbine blades; the said rotors, through their hub-like parts, keyed to
   c. a power output shaft, and the central section of the said shaft supported in the roller bearings in the hub-like part of
   d. a stationary cylindrical power chamber, which, because of its position in the middle of the configuration, separating the rotors into opposite, but parallel, rotating members, and the engine's casing into two opposite half-casings, but holding the latters securely to its radial sides, and which contains a plurality of arcuate combustors whose cross section being generally round, and which have bifurcated exhaust nozzles aimed at turbine blades on the radial sides of the assembled rotors; the said power chamber supporting in the roller bearings of the semi-cylindrical extension of its peripheral wall a dam shaft that extends over the paired rotors;
   e. two pairs of dams, each pair positioned diametrically opposite of the other on the peripheral surface of the engine's casing and extending into the compression chambers of the rotors, each dam mounted securely on each end section of the said dam shaft with the plane of one dam made perpendicular to that of the other dam on the same shaft, and each dam designed to close exactly at the proper time so that the advancing piston could compress gasses against it, and to open at the precise time to permit the piston to pass through no matter how slow or how fast the engine may be running and without any direct human or electronic help;
      d1. the said dams opening and closing at the correct time by virtue of the perpendicularity of the planes of the paired dams, the angular distance of 180° separating the two parallel piston heads, the length of the arcuate piston being less than 180° the paired rotors being keyed to the same shaft which make them rotate together at the same time, at the same acceleration,, and in the same direction (which set of data being sufficient to bring into the range of comprehension of one skilled in the art to which it is related as to how the mechanism works);
   f. a plurality of passageways for compressed gases originating in the said rotors and comunicating with channels that lead into the combustors;
   g. a lubrication means, consisting of a handleless cylindrical rod rotatably held in a slot in the wall of each rotor's oil reservoir, that spreads lubricants by the rolling actions and movements of the contacting surface; and
   h. a plurality of curved spoke-like members in each rotor's wheel-like section that draw ambient air into the center of the engine for internal cooling, and that cool the engine more effectively than the conventional external fanning could.

* * * * *